United States Patent
Yen et al.

(10) Patent No.: US 8,434,050 B2
(45) Date of Patent: Apr. 30, 2013

(54) PRINTED CIRCUIT BOARD LAYOUT SYSTEM AND METHOD

(75) Inventors: Shin-Ting Yen, New Taipei (TW); Shou-Kuo Hsu, New Taipei (TW); Yung-Chieh Chen, New Taipei (TW); Dan-Chen Wu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/214,256

(22) Filed: Aug. 22, 2011

(65) Prior Publication Data

US 2012/0174054 A1 Jul. 5, 2012

(30) Foreign Application Priority Data

Dec. 31, 2010 (TW) ................................ 99147086 A

(51) Int. Cl.
*G06F 17/50* (2006.01)

(52) U.S. Cl.
USPC ........................................................ 716/137

(58) Field of Classification Search .................... 716/137
See application file for complete search history.

(56) References Cited

U.S. PATENT DOCUMENTS

2009/0268419 A1* 10/2009 Choi et al. ..................... 361/767
2012/0174054 A1* 7/2012 Yen et al. ....................... 716/137

* cited by examiner

*Primary Examiner* — Vuthe Siek
(74) *Attorney, Agent, or Firm* — Altis Law Group, Inc.

(57) ABSTRACT

A computing system includes a drawing unit and a layout unit. The computing system sets components parameters to components of a circuit diagram of a printed circuit board (PCB). The drawing unit draws the circuit diagram by using the components with the components parameters. If the drawing unit wants to use a component more than once, the computing system copies the component and the corresponding components parameters. The drawing unit uses the copied components and the corresponding parameters. If the circuit diagram has been drawn, the layout unit loads the circuit diagram and wires the PCB according to the components and the components parameters in the circuit diagram.

9 Claims, 3 Drawing Sheets

PRINTED CIRCUIT BOARD LAYOUT SYSTEM AND METHOD

BACKGROUND

1. Technical Field

Embodiments of the present disclosure generally relate to printed circuit board (PCB) management, and more particularly to a PCB layout system and method for designing layout of a PCB.

2. Description of Related Art

Layout of a printed circuit board (PCB) can be achieved by drawing a circuit diagram and wiring according to the circuit diagram. In order to ensure precision of the layout, parameters of components of the PCB can be set during wiring of the PCB. If another PCB, including the same components, needs to be wired, the parameters of the same components have to be set again.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
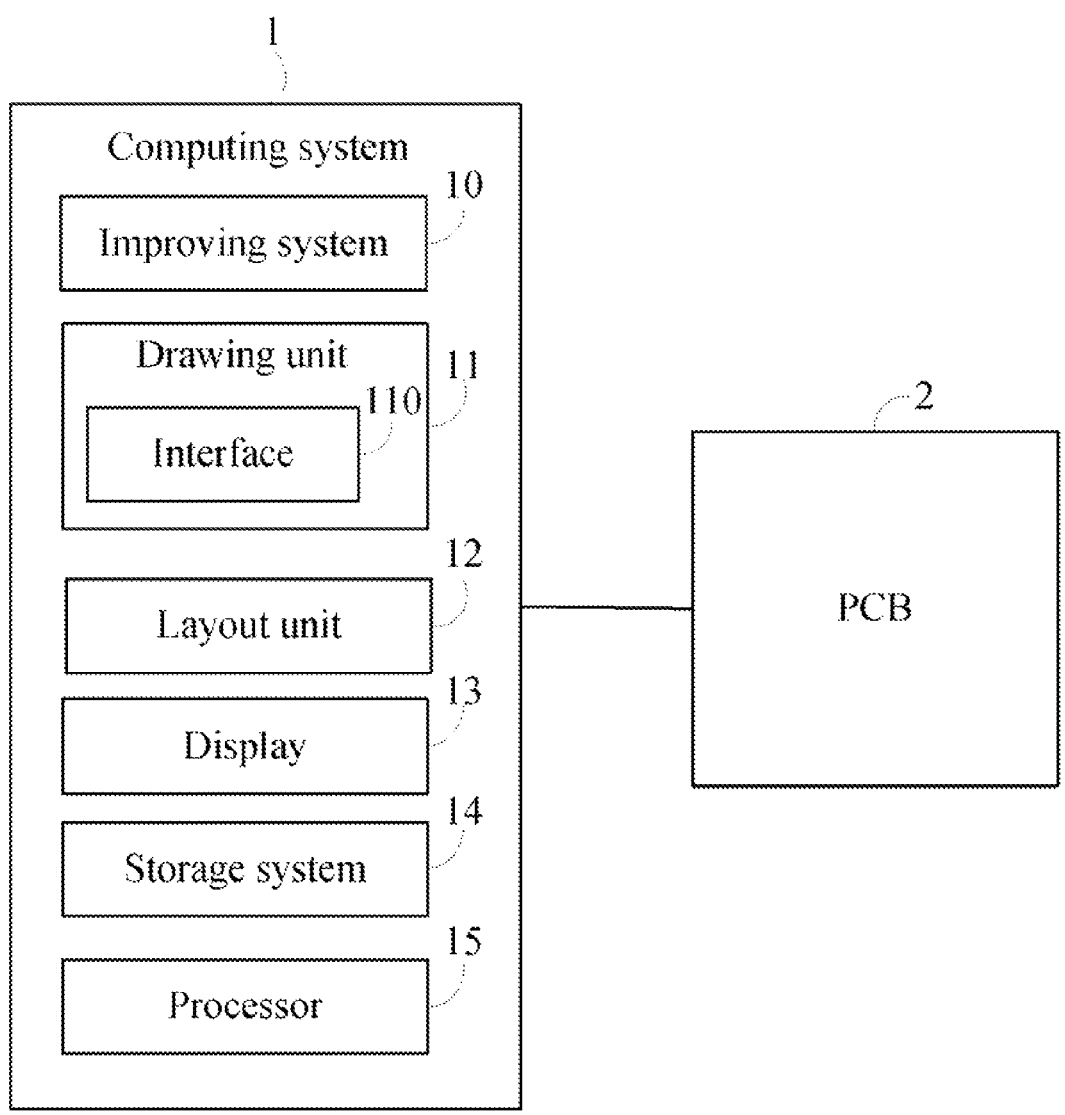
FIG. 1 is a block diagram of one embodiment of a computing system including an improving system.

FIG. 1 is a block diagram of one embodiment of a computing system 1 including an improving system 10. The computing system 1 further includes a drawing unit 11, a layout unit 12, a display 13 and a storage system 14. The computing system 1 is electronically connected to a printed circuit board (PCB) 2. The storage system 14 stores components parameters of a plurality of components of the PCB 2. In some embodiments, the plurality of components may include capacitors, resistors, vias, for example. The drawing unit 11 draws a circuit diagram of the PCB 2 on an interface 110 provided by the drawing unit 11 according to the components parameters stored in the storage system 14. In one embodiment, the drawing unit 11 may be computer aided design (CAD) software. The interface 110 may be a drawing area provided by the CAD software and displayed on the display 13. The layout unit 12 wires the PCB 2 on the display 13 according to the circuit diagram of the PCB 2. The improving system 10 sets components parameters for the components of the circuit diagram when the drawing unit 11 draws the circuit diagram. After the circuit diagram has been drawn, the layout unit 12 loads the components and the components parameters from the drawing unit 11, and wires the PCB 2 according to the loaded components and the components parameters. In some embodiments, the components parameters may include a trace length, a phase tolerance, and/or a net spacing type. It should be understood that "wire" is defined to mean an electronic layout of components, traces, and other components of the PCB 2.

In one embodiment, the computing system 1 includes at least one processor 15. The improving system 10 may include one or more modules. The one or more modules may comprise computerized code in the form of one or more programs that are stored in the storage system 14 (or memory). In one embodiment, the storage system 14 may be a magnetic or an optical storage system, such as a hard disk drive, an optical drive, a compact disc, a digital video disc, a tape drive, or other suitable storage medium. The computerized code includes instructions that are executed by the at least one processor 15 to provide functions for the one or more modules.

Figure 2:
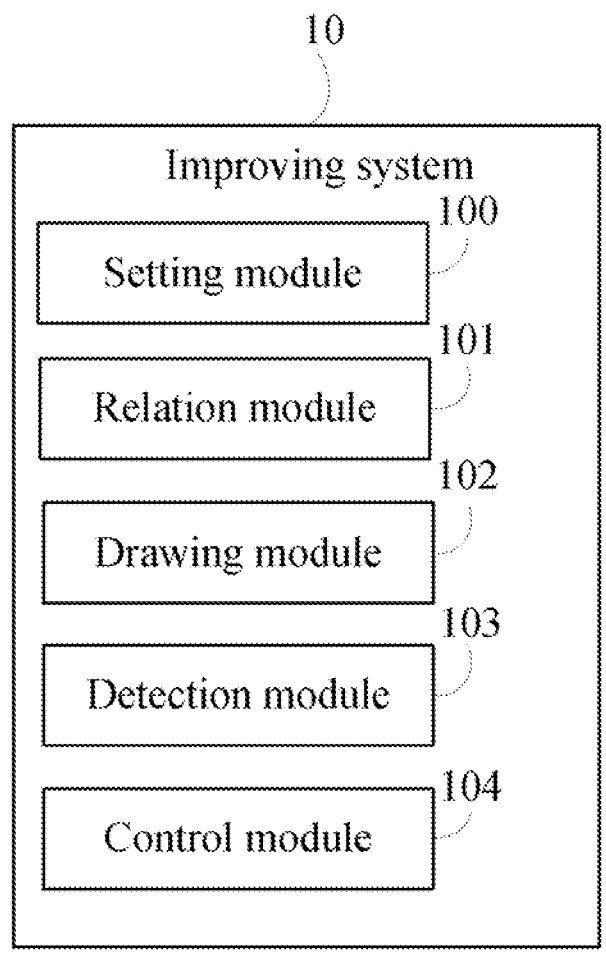
FIG. 2 is a block diagram of one embodiment of the function modules of the improving system in FIG. 1.

As shown in FIG. 2, the improving system 10 may include a setting module 100, an relation module 101, a drawing module 102, a detection module 103, and a control module 104.

The setting module 100 sets components parameters for the components of the circuit diagrams.

The relation module 101 associates the components parameters with each corresponding component. In one embodiment, the parameters are associated with the corresponding component by setting the parameters as attributes of the corresponding component.

The drawing module 102 controls the drawing unit 11 to draw the circuit diagram on the interface 110 provided by the drawing unit 11 according to the components with the parameters. The circuit diagram is a simplified conventional graphical representation of an electric circuit of the PCB 2. The circuit diagram shows the components as simplified standard symbols, and shows connections between the components. The connections including power and signal connections.

When drawing the circuit diagram, the detection module 103 detects if a component is being used more than once. If the component is used more than once, the drawing module 102 copies the component and the parameters of the component, and controls the drawing unit 11 to use the copied component and the corresponding parameters to draw the circuit diagram. If there is no component being used more than once, the detection module 103 detects if the drawing unit 11 has completed drawing the circuit diagram of the PCB 2. If the drawing unit 11 has not completed drawing the circuit diagram, the drawing unit continues to draw the circuit diagram.

If the drawing unit 11 has completed drawing the circuit diagram, the control module 104 controls the layout unit 12 to load the circuit diagram, and wires the PCB 2 according to the components and the components parameters in the circuit diagram.

Figure 3:
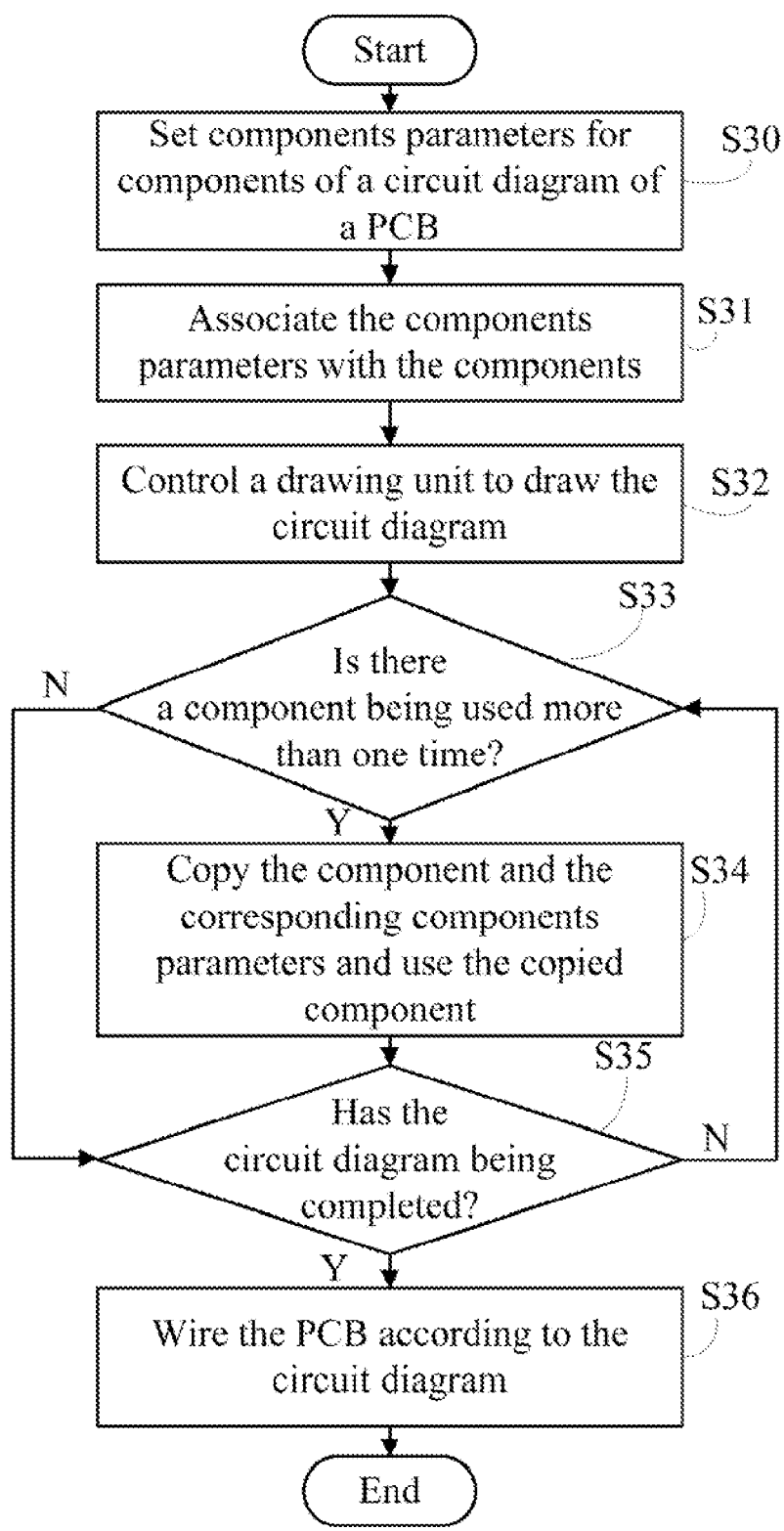
FIG. 3 is a flowchart illustrating one embodiment of a method of PCB layout.

FIG. 3 is a flowchart illustrating a method of PCB layout. Depending on the embodiment, additional blocks may be added, others removed, and the ordering of the blocks may be changed.

In block S30, the setting module 100 sets parameters for the components of the circuit diagram.

In block S31, the relation module 101 associates the components parameters with each corresponding component.

In block S32, the drawing module 102 controls the drawing unit 11 to draw the circuit diagram according to the components with the components parameters.

In block S33, the detection module 103 detects if a component is used more than once. If the component is used more than once, block S34 is implemented. If there is no component being used more than once, block S35 is implemented.

In block S34, the drawing module 102 copies the component and the components parameters, and controls the drawing unit 11 to use the copied component and the corresponding components parameters to draw the circuit diagram.

In block S35, the detection module 103 detects if the drawing unit 11 has completed drawing the circuit diagram of the PCB 2. If the drawing unit 11 has completed drawing the circuit diagram of the PCB 2, block S36 is implemented. If the drawing unit 11 has not completed, block S33 is repeated.

In block S36, the control module 104 controls the layout unit 12 to load the circuit diagram from the drawing unit 11, and wires the PCB 2 according to the components and the components parameters in the circuit diagram.

Although certain inventive embodiments of the present disclosure have been specifically described, the present disclosure is not to be construed as being limited thereto. Various changes or modifications may be made to the present disclosure beyond departing from the scope and spirit of the present disclosure.

What is claimed is:

1. A computing system, comprising:
   a storage system;
   at least one processor; and
   one or more programs being stored in the storage system and executable by the at least one processor, the one or more programs comprising:
   a setting module operable to set parameters for components of a circuit diagram of a printed circuit board (PCB);
   a drawing module operable to control a drawing unit to draw the circuit diagram on an interface provided by the drawing unit, and copy a component and the parameters of the component if the component is used to draw the circuit diagram more than once; and
   a control module operable to control a layout unit to load the circuit diagram from the drawing unit, and wire the PCB according to the components and the parameters of the components in the circuit diagram displayed on a display.

2. The computing system as described in claim 1, further comprising: a relation module operable to associate the parameters with the corresponding components.

3. The computing system as described in claim 1, wherein the components includes capacitors, resistors, and vias.

4. A computer-based method of printed circuit board (PCB) layout being performed by execution of computer readable program code by a processor, the method comprising:
   setting parameters for components of a circuit diagram of the PCB by the processor;
   controlling a drawing unit to draw the circuit diagram on an interface provided by the drawing unit, and copying a component and the parameters of the component by the processor, if the component is used to draw the circuit diagram more than once; and
   controlling a layout unit to load the circuit diagram, and wiring the PCB by the processor, according to the components and the parameters in the circuit diagram displayed on a display.

5. The method as described in claim 4, before block controlling a drawing unit to draw the circuit diagram further comprising: associating the parameters with the corresponding components by the processor.

6. The method as described in claim 4, wherein the components includes capacitors, resistors, and vias.

7. A non-transitory storage medium having stored thereon instructions that, when executed by a processor, cause the processor to perform a method of printed circuit board (PCB) layout, the method comprising:
   setting parameters for components of a circuit diagram of the PCB;
   controlling a drawing unit to draw the circuit diagram on an interface provided by the drawing unit, and copying a component and the parameters of the component if the component is used to draw the circuit diagram more than once; and
   controlling a layout unit to load the circuit diagram from the drawing unit, and wiring the PCB according to the components and the parameters in the circuit diagram displayed on a display.

8. The non-transitory storage medium as described in claim 7, before block controlling a drawing unit to draw the circuit diagram further comprising: associating the parameters with the corresponding components.

9. The non-transitory storage medium as described in claim 7, wherein the components includes capacitors, resistors, and vias.

* * * * *